UNITED STATES PATENT OFFICE.

ARTHUR WEINBERG AND OTTO LANGE, OF FRANKFORT-ON-THE-MAIN, GERMANY, ASSIGNORS TO LEOPOLD CASSELLA & CO., OF FRANKFORT-ON-THE-MAIN, GERMANY.

YELLOW SULFUR DYE AND PROCESS OF MAKING SAME.

SPECIFICATION forming part of Letters Patent No. 712,747, dated November 4, 1902.

Application filed July 14, 1902. Serial No. 115,685. (No specimens.)

*To all whom it may concern:*

Be it known that we, ARTHUR WEINBERG and OTTO LANGE, citizens of Prussia, and residents of Frankfort-on-the-Main, in the Province of Hesse-Nassau, Kingdom of Prussia, Germany, have invented certain new and useful Improvements in Yellow Sulfur Dye and Process of Making Same, of which the following is a specification.

We have discovered that if sulfur is allowed to act upon toluylenediamin at a temperature not exceeding 220° centigrade derivatives hitherto unknown are formed, which by means of a subsequent process may be made soluble in water and in this form are exceedingly valuable, direct dyeing yellow cotton dyestuffs. The best proportions of toluylenediamin and sulfur are about one to two. The bases are, however, still obtained when working with the proportion of one to 1.5. The quantity of sulfur may be increased even to one to four, as the excess of sulfur remains unaffected.

The method of production is illustrated by the following example: Fifty kilos meta-toluylenediamin are introduced into one hundred kilos sulfur previously melted in an iron vessel provided with stirrers. The melt is rendered fluid on the temperature being raised, and sulfureted hydrogen is generated with violence. The temperature is then raised within two hours to about 190° centigrade and then the melt stopped. The sulfur body so obtained is a brown-yellow to orange-yellow amorphous substance insoluble in all organic solvents, water, dilute acids, or alkalies. It dissolves a little in concentrated sulfuric acid with a brownish color. For transforming this body into a soluble dyestuff it is preferably heated with concentrated caustic-soda lye or a concentrated solution of sodium sulfid. Water must, however, always be present in this operation, and the temperature should not exceed 150° centigrade.

The method of transformation is illustrated by the following example: One hundred kilos of the powdered melt obtained according to Example I are gradually introduced at 110° centigrade into a solution of ninety kilos caustic-soda lye dissolved in sixty kilos water and heated to 110° to 120° centigrade until a test shows that the body has become completely soluble. Water is then added for diluting purposes, the solution filtered off, and the dissolved dyestuff separated by the addition of muriatic acid. It is obtained as a difficultly-soluble yellow precipitate. It is then filtered off and dried. The dyestuff so obtained is easily soluble in water in the presence of caustic alkalies or alkaline sulfids and dyes unmordanted cotton yellow shades of absolute resistance to washing, milling, and acids. It is almost insoluble in concentrated sulfuric acid.

Having now described our invention and in what manner it may be carried out, what we claim is—

1. The process of producing yellow sulfur dyestuffs by heating meta-toluylenediamin and sulfur together at a temperature not exceeding 220° centigrade and converting the thus-obtained insoluble substance into a soluble dyestuff by heating it with caustic alkalies or alkaline sulfids substantially as described.

2. The yellow coloring-matter containing sulfur obtainable as hereinbefore described, soluble in water in the presence of caustic alkalies or alkaline sulfids with a yellow color, almost insoluble in concentrated sulfuric acid, dyeing unmordanted cotton fast yellow shades substantially as described.

Signed at Frankfort-on-the-Main, in the Province of Hesse-Nassau, Kingdom of Prussia, Germany, this 18th day of June, A. D. 1902.

ARTHUR WEINBERG.
OTTO LANGE.

Witnesses:
JEAN GRUND,
CARL GRUND.